United States Patent [19]
Carrazza et al.

[11] Patent Number: 5,840,271
[45] Date of Patent: Nov. 24, 1998

[54] SYNTHETIC MATERIAL WITH HIGH VOID VOLUME ASSOCIATED WITH MESOPOROUS TORTUOUS CHANNELS HAVING A NARROW SIZE DISTRIBUTION

[75] Inventors: Jose Carrazza, San Antonio; Jose Rafael Cordova, El Paraiso; Juan Lujano, Los Chaguaramos; Jose Manuel Cruz, Los Pequs, all of Venezuela

[73] Assignee: Intevep, S.A., Caracas, Venezuela

[21] Appl. No.: 794,204

[22] Filed: Jan. 31, 1997

Related U.S. Application Data

[63] Continuation-in-part of Ser. No. 605,286, Feb. 9, 1996, abandoned.

[51] Int. Cl.$^6$ .......................... C01B 33/36; C04B 38/00
[52] U.S. Cl. .......................... 423/700; 423/701; 423/704; 423/705; 501/80; 501/81
[58] Field of Search .................. 423/700, 701, 423/704, 705; 501/80, 81; 502/60, 64

[56] References Cited

U.S. PATENT DOCUMENTS

| | | | |
|---|---|---|---|
| 4,622,311 | 11/1986 | Wakui et al. | 423/327.1 |
| 4,793,984 | 12/1988 | Lok et al. | |
| 5,098,684 | 3/1992 | Kresge et al. | |
| 5,250,282 | 10/1993 | Kresge et al. | 423/705 |
| 5,304,363 | 4/1994 | Beck et al. | 423/328.1 |
| 5,320,822 | 6/1994 | Ozin et al. | 423/700 |
| 5,334,368 | 8/1994 | Beck et al. | 423/704 |
| 5,538,710 | 7/1996 | Guo et al. | 423/701 |
| 5,563,212 | 10/1996 | Dimukes et al. | 524/786 |
| 5,589,153 | 12/1996 | Garces et al. | 423/705 |
| 5,601,798 | 2/1997 | Cooper et al. | 423/700 |
| 5,622,684 | 4/1997 | Pinnavaia et al. | 423/702 |
| 5,643,987 | 7/1997 | Dismukes et al. | 524/442 |

FOREIGN PATENT DOCUMENTS

| | | |
|---|---|---|
| 0131925 | 1/1985 | European Pat. Off. |
| 1509003 | 4/1978 | United Kingdom . |

*Primary Examiner*—Karl Group
*Attorney, Agent, or Firm*—Bachman & LaPointe, P.C.

[57] ABSTRACT

A process for preparing an inorganic porous material, includes the steps of forming a solution of a hydrolyzable inorganic compound with a non-ionic surfactant having organic molecules; inducing growth and condensation of a solid composition comprising an inorganic composition in intimate contact with said organic molecules; and extracting said organic molecules from said inorganic composition so as to provide said inorganic porous material having wall portions defining mesopore-sized channels having a mean diameter of between about 15 Å to about 100 Å and a narrow diameter distribution of less than or equal to about 30 Å, said material having a void volume from said mesopore-sized channels of at least about 0.1 cc/g.

19 Claims, 5 Drawing Sheets

SYNTHETIC MATERIAL WITH HIGH VOID VOLUME ASSOCIATED WITH MESOPOROUS TORTUOUS CHANNELS HAVING A NARROW SIZE DISTRIBUTION

RELATED APPLICATIONS

The instant application is a continuation-in-part of U.S. patent application Ser. No. 08/605,286 which was filed on Feb. 9, 1996, now abandoned.

BACKGROUND OF THE INVENTION

The invention relates to a synthetic material having a high void volume attributable to tortuous mesopore-sized channels having a mean diameter between about 15 Å and about 100 Å and a narrow size distribution of less than or equal to about 30 Å, and a process for preparing same.

Processing of feedstocks having large organic molecules such as heavy hydrocarbons, fine chemicals, and/or pharmaceutical products involving catalysts or adsorbents is typically inefficient and/or expensive due to the lack of materials with appropriate qualities. One of the main constraints for these active agents is the lack of sufficient pores of appropriate size to carry out the desired processes.

U.S. Pat. No. 5,098,684 discloses a family of materials containing an ordered array of uniformly sized mesopores, prepared with the aid of quaternary-amine surfactants (cationic surfactants). Although these materials contain large mesopore volumes distributed in narrow size distributions, they are constituted by thin walls. This characteristic is inherent to the process used in preparing the material. The '684 patent discloses the use of cationic surfactants which give rise to strong electrostatic interactions with the inorganic species in solution, thereby leading to the formation of materials with thin amorphous walls (less than 15 Å thick). This material, however, has limited practical value, since the walls easily collapse under hydrothermal treatment conditions typical of many conventional hydrocarbon conversion processes. The use of quaternary amine surfactants as template agents is also undesirable because of the high cost and toxicity of these materials.

It is therefore evident that the need remains for a synthetic material having high void volume and appropriate pore sizes for use in treating feedstocks having large organic molecules.

It is therefore the primary object of the present invention to provide a material having a high void volume associated to mesoporous channels with a narrow size distribution and having adequate hydrothermal stability.

It is a still further object of the present invention to provide a process for preparing the synthetic material of the present invention.

Other objects and advantages of the present invention will appear hereinbelow.

SUMMARY OF THE INVENTION

In accordance with the invention, the foregoing objects and advantages are readily attained.

According to the invention, a synthetic material is provided which comprises an inorganic porous material having wall portions defining mesopore-sized channels having a mean diameter of between about 15 Å to about 100 Å and a narrow diameter distribution of less than or equal to about 30 Å, said material having a void volume from said mesopore-sized channels of at least about 0.1 cc/g.

Still further according to the invention, a process is provided for preparing the synthetic porous material according to the invention which process comprises the steps of forming a solution of a hydrolyzable inorganic compound with a non-ionic surfactant having organic molecules; inducing growth and condensation of a solid composition comprising an inorganic composition in intimate contact with said organic molecules; and extracting said organic molecules from said inorganic composition so as to provide said inorganic porous material having wall portions defining mesopore-sized channels having a mean diameter of between about 15 Å to about 100 Å and a narrow diameter distribution of less than or equal to about 30 Å, said material having a void volume from said mesopore-sized channels of at least about 0.1 cc/g.

BRIEF DESCRIPTION OF THE DRAWINGS

A detailed description of preferred embodiments of the present invention follows, with reference to the attached drawings, wherein.

DETAILED DESCRIPTION

The invention relates to a synthetic material which advantageously possesses high void volume generated by mesoporous channels with a narrow size distribution and which further exhibits enhanced stability under thermal and hydrothermal treatment conditions.

According to the invention, a synthetic material is provided having a high void volume, preferably at least 0.1 cc/g and more preferably at least about 0.2 cc/g, wherein the void volume is attributable to or generated from tortuous channels defined in the material. The channels preferably have a mean diameter between about 15 Å and about 100 Å and a narrow size distribution less than or equal to about 30 Å. The material is preferably a short range order structure (as described below) which has enhanced hydrothermal stability. These advantageous characteristics allow the synthetic material of the present invention to be used in treating a feedstock having a fraction of large-hydrocarbon molecules. During such treatment, larger molecules are upgraded, converted or otherwise treated in sites within the mesoporous channels. In a different process, a component of the feedstock may also be separated by selective adsorption into the mesoporous channels of the synthetic material.

The synthetic material according to the invention also advantageously exhibits enhanced stability in the presence of steam and/or high temperatures, for example up to at least about 500° C., making the material excellently suited for use in processes involving thermal and hydrothermal steps. It is believed that the enhanced stability of material of the present invention results from relatively thick walls of the material that define the mesoporous tortuous channels.

The narrow size distribution of mesoporous channels in the synthetic material of the present invention is exhibited, for example, by a nitrogen adsorption isotherm having sharp inflection points at $P/P_0$ values of between about 0.05 to about 0.8, and a relatively flat isotherm above $P/P_0$ of 0.8, indicating mesopore pore size distribution of between about 15 Å to about 100 Å. The short range order in the synthetic material of the present invention is exhibited, for example, by a high energy electron diffraction pattern (EDP) containing only diffuse halos at d spacing larger than 20 Å. One or more halos may be exhibited. This short range order is indicative of material having structural features (believed to be the tortuous channels) that repeat themselves substantially throughout the material, but in correlations where the feature extends only a few times (up to about five times, while in the case of crystalline materials features can repeat themselves thousands, or at the very least hundreds of times). This material is referred to as a material having a repeat value of less than or equal to about 5.

In further accordance with the invention, a process for preparing the synthetic material of the present invention is provided. Advantageously, the process serves to provide a synthetic material having short range order and tortuous mesoporous channels formed therein wherein the channels are defined by walls believed to have a thickness sufficient to enhance resistance of the synthetic material to use in thermal and hydrothermal processes. This is advantageous in that conventionally prepared materials either possess very wide mesopore size distributions (between 50 Å and 1000 Å) or possess poor thermal and hydrothermal stability in same rendering the conventionally prepared materials undesirable for many processes, especially those involving treatment of feedstocks having large organic molecule fractions.

According to the invention, an inorganic porous material is prepared by forming a solution of a hydrolyzable inorganic compound with a non-ionic surfactant having organic molecules. The solution is thoroughly mixed, and then treated so as to induce the formation of a solid material comprising an inorganic composition in intimate contact with the organic molecules of the non-ionic surfactant. Solids may be formed by gelation of the hydrolyzable inorganic compounds at pH values near the isoelectric point of the inorganic species in solution, and further condensation of the gel to form a solid material by aging of the gel at low temperatures, between about 0° C. and 40° C., and/or by thermal treatment at temperatures between about 40° C. and 120° C.

The solid material so obtained is then preferably separated from remaining liquid of the solution, for example by centrifugation, washed with water, and dried at room temperature, preferably under reduced pressure.

The washed and dried solid is then treated, preferably through calcination or solvent extraction, so as to extract the non-ionic surfactant from the inorganic composition so as to provide an inorganic material with a high void volume of at least about 0.1 cc/g generated by or attributable to the tortuous channels, and having a mean diameter between about 15 Å to about 100 Å and a narrow size distribution of less than or equal to about 30 Å. As set forth above, the material formed in accordance with the process of the present invention is a short range order structure indicating a material which is an intermediate case between crystalline (long-range) and disordered materials.

In accordance with the invention, the conditions inducing the growth and condensation of the hydrolyzable compound are controlled so as to form chain-like polymeric inorganic species that favor attractive interactions (by hydrogen bonding and/or Van der Waals forces) with the polar groups of the non-ionic surfactant. This may suitably be carried out by providing and maintaining a pH of the solution which is equal to or within about ±2 pH numbers of the isoelectric point mean value of the inorganic species or combination of inorganic species in solution. At the isoelectric point the condensation step is relatively slow, and the hydrolyzable species tend to polymerize into linear molecules that are occasionally cross-linked. These molecular chains entangle and form additional branches. These chain-like species are pervious to the non-ionic surfactant, facilitating the establishment of attractive interactions. At synthesis conditions far from the isoelectric point, the polymerization rate is fast, leading to the formation of more highly branched clusters that are not penetrable, and cannot easily interact with the non-ionic surfactant. Furthermore, near the isoelectric point, the hydrolyzed groups of the inorganic species in solution contain for the most part hydroxyl groups, favoring attractive interactions with the electron donor groups of the non-ionic surfactant by H bonding.

The pH of the solution may be adjusted according to the invention by adding acid to the solution, preferably hydrochloric acid (HCl), although other acids may also be used.

In accordance with the invention, the hydrolyzable inorganic compound may suitably be selected from the group consisting of chlorides, alkoxides, nitrates, hydroxides, sulphates, and mixtures thereof, among others, preferably nitrates, hydroxides and mixtures thereof. Also the inorganic species in solution can be prepared by dissolution of an oxide with an appropriate acid or base. Further, precursors to the oxides may be used, such as colloidal silica, alumina sols, suspensions of pseudo-bentonite, titania or zirconia and/or hydrosols of any oxide, among others.

The non-ionic surfactant of the present invention may suitably be selected from the group consisting of ethoxylated alcohols, ethoxylated alkylphenols, amine oxides, ethoxylated amines and mixtures thereof. The non-ionic surfactant may suitably be mixed in solution with the inorganic compound so as to provide a molar ratio of ionic surfactant to inorganic species of between about 0.05 to about 20.

Any metal oxide or mixture of oxides can be prepared with the method of the present invention, as long as the appropriate pH value is selected. An indication of this value is given by the isoelectric point of the respective solid oxides or hydroxides, some of which are summarized in Table 1, and with an extensive compilation given by G. A. Parks, Chemistry Reviews, Vol. 65, pages 177 to 198, 1965.

TABLE 1

| MATERIAL | ISOELECTRIC POINT |
| --- | --- |
| Silica | 1.8 to 2.2 |
| Alumina | 8.0 to 9.2 |
| Titania | 4.7 to 6.2 |
| Magnesia | 11 to 12 |
| Iron Oxide | 5.2 to 7.4 |

The isoelectric point mean value for the materials of TABLE 1, as used herein, are set forth in TABLE 2.

TABLE 2

| MATERIAL | ISOELECTRIC POINT MEAN VALUE |
| --- | --- |
| Silica | 2.00 |
| Alumina | 8.60 |
| Titania | 5.45 |
| Magnesium | 11.50 |
| Iron Oxide | 6.30 |

In accordance with the invention, the solid porous inorganic material obtained in accordance with the invention has a high void volume, at least about 0.1 cc/g, attributable to tortuous channels with a mean diameter between about 15 Å and about 100 Å and a narrow size distribution of less than or equal to about 30 Å, wherein the material is a short range order material having stability for use in thermal and hydrothermal treatments and processes.

As set forth above, during solvent extraction or calcination, the non-ionic surfactant is extracted and removed from intimate contact with the inorganic material, thereby vacating mesopore-sized tortuous channels having the desired mean diameter between about 15 Å and about 100 Å, and distributed in a narrow size distribution no more than 30 Å wide. Calcining is preferably carried out in accordance with the invention at a temperature of between about 400° C. to about 800° C., for a period of at least about 1 hour. Of course, different materials may require different calcination times and temperatures for a proper extraction.

It should be noted that the total volume of mesopore void volume formed in the final product depends upon the size and concentration of the non-ionic surfactant in the starting solution. Further, the actual size of mesopore-sized channels depends upon the size or molecular weight of the organic molecules. Thus, the amount and size of organic molecule to be used in solution may be selected so as to provide the desired mesopore total void volume and mesoporous channel size.

The amount and size of the mesoporous-sized void volume can also be selectively controlled by adding organic water-insoluble compounds to the mixture of the inorganic species and the non-ionic surfactant. These water-insoluble compounds combine with the hydrophobic tail of the surfactant, and increase the size of the micelle around which the inorganic species condense, thus increasing the size and volume of resulting mesopore-sized channels in the material of the present invention. Suitable organic water-insoluble compounds according to the invention may be selected from the group consisting of p-xylene, trimethylbenzene, triethylbenzene, dimethyladamantane and mixtures thereof.

As is the case with many catalysts, it may be advantageous to combine the material of the present invention with a matrix material that has desirable thermal, mechanical or other properties. The material of the present invention may also be combined with other materials, used as diluents to control the amount of conversion in a given process. Examples of such materials are aluminas, silicas, silica-aluminas, magnesias, titanias, zirconias, carbons and their precursors, clays and mixtures thereof. Also, precursors to the above mentioned materials can be used, such as colloidal silica, alumina sols, suspensions of pseudo-bohemite, titania, or zirconia, and hydrosols of any above mentioned oxides, among others. These materials may be combined with the material of the present invention during preparation or in a post-synthesis process. Also, these materials may be provided in part in colloidal form so as to facilitate extrusion of the bound components.

The material of the present invention is useful as a catalyst for conversion of organic compounds, especially large hydrocarbons with molecular sizes of about 15 Å or more. It is particularly useful for catalyzing reactions that occur in the presence of acidic sites, in which the large hydrocarbon molecule is converted into products of lower molecular weight or into more valuable isomers. Examples of such reactions are involved in processes such as cracking, hydrocracking and isomerization. In such processes the material of the present invention presents various advantages over conventional catalysts. The large mesopore size and void volume allow large hydrocarbon molecules to easily access the catalytically active sites located on the material, thereby minimizing diffusional constraints. The improved diffusion through channels also allows the primary products from the transformation and or conversion of the large hydrocarbon molecule to exit the material before secondary reactions can take place, thereby retarding or even avoiding the formation of undesirable secondary products such as coke which could eventually plug the channels or deactivate catalytic sites on the material.

It may also be advantageous to incorporate into the material of the present invention minor amounts of metals as catalytic components, especially noble metals such as platinum, rhodium, rhenium, or iridium, or Group VIII metals such as nickel, iron or cobalt, or Group VI metals such as chromium, molybdenum or tungsten, or mixtures thereof. These metals may be present in their metallic state, or as oxides, sulfides or mixtures thereof. These metals could provide the material of the present invention with desired catalytic properties for processes such as hydrotreatment, hydroisomerization, hydrocracking, hydrogenation and/or reforming, to convert large hydrocarbon molecules into more valuable products.

The material of the present invention may also be advantageously used as a sorbent for the selective separation of one or more components in a feed. The narrow size distribution of mesopore-sized channels and the large void volume allow for separation of components in the feed by size exclusion of molecules. The walls of the material of the present invention provide for sites that can be modified through incorporation of molecules that contain specific functional groups with affinity toward specific components in the mixture, allowing their separation from the feed. Examples include the incorporation of amines to preferentially adsorb acidic components in a feed, or chelating agents that separate metal contaminations off a stream. Also, these sites on the walls of the material of the present invention can be used to incorporate compounds that can control the hydrophilicity of the environment within the pores or channels, advantageously allowing the separation of polar from non-polar components in a feed.

Although the material of the present invention is useful in the treatment of any hydrocarbon molecule, it is particularly advantageous when used for the treatment of large molecules that are too big to fit into the channels of more conventional catalysts and/or sorbents. The material of the present invention is especially suited for the treatment of high boiling point hydrocarbon fractions in crude oils such as atmospheric and vacuum gas oils, high boiling point products from processes such as catalytic cracking, thermal cracking, lube production and the like and non-distillable fractions from crude oil or from conversion processes such as residual feeds. The material of the present invention could also be utilized with feeds of non-petroleum origin.

The following examples further demonstrate the advantageous characteristics of the inorganic composition and process for preparation of same in accordance with the present invention.

EXAMPLE 1

In this example, a porous silicate composition is provided according to the invention.

An acid solution of non-ionic surfactant was formed by mixing 17.7 g of water, 9.1 g of HCI (37% wt) and 1.1 g para-nonyl phenol ethoxylated with fifteen moles of ethylene oxide per mole of alkylphenol (C9H19-Ph-O—(CH2—CH2—O) 14-CH2—CH2—OH, where Ph is phenyl group). The solution was mixed with 2.1 g of tetraethylorthosilicate (TEOS) (98% wt) for 2 minutes at room temperature, giving rise to a clear solution with the following molar composition:

1 $SiO_2$:0.10 C9H19(EO)15:9.00 HCl:127.50 $H_2O$

This clear solution was placed in a sealed 60 ml teflon-wall reactor, where it was kept at 20° C. for 72 hours, and then heated to 60° C. for 72 more hours. After this treatment a white solid was formed. This product was separated from the liquid by centrifuge, washed with water several times, and dried at room temperature under reduced pressure. Finally, the solid was calcined at 400° C. for 18 hours, in a flow of air.

Figure 1:
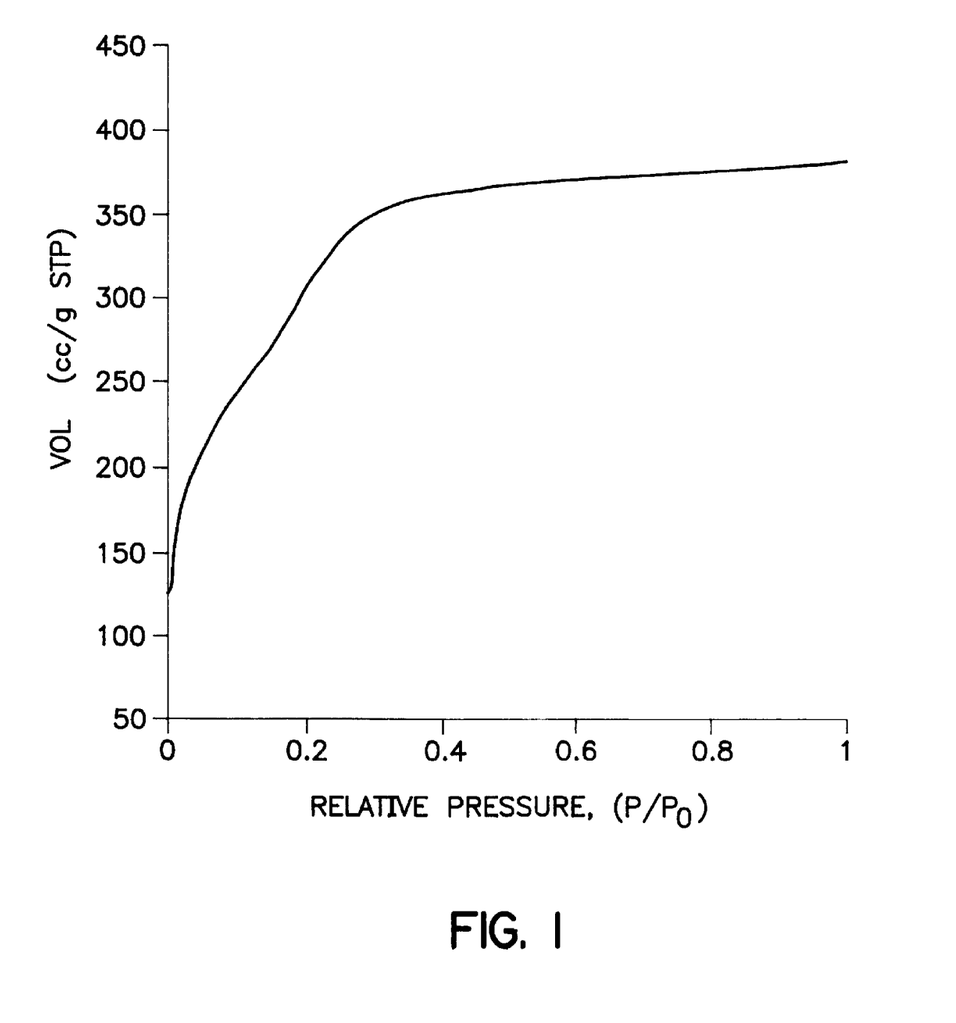
FIG. 1 is the $N_2$ adsorption isotherm for the product of Example 1.
Figure 2:
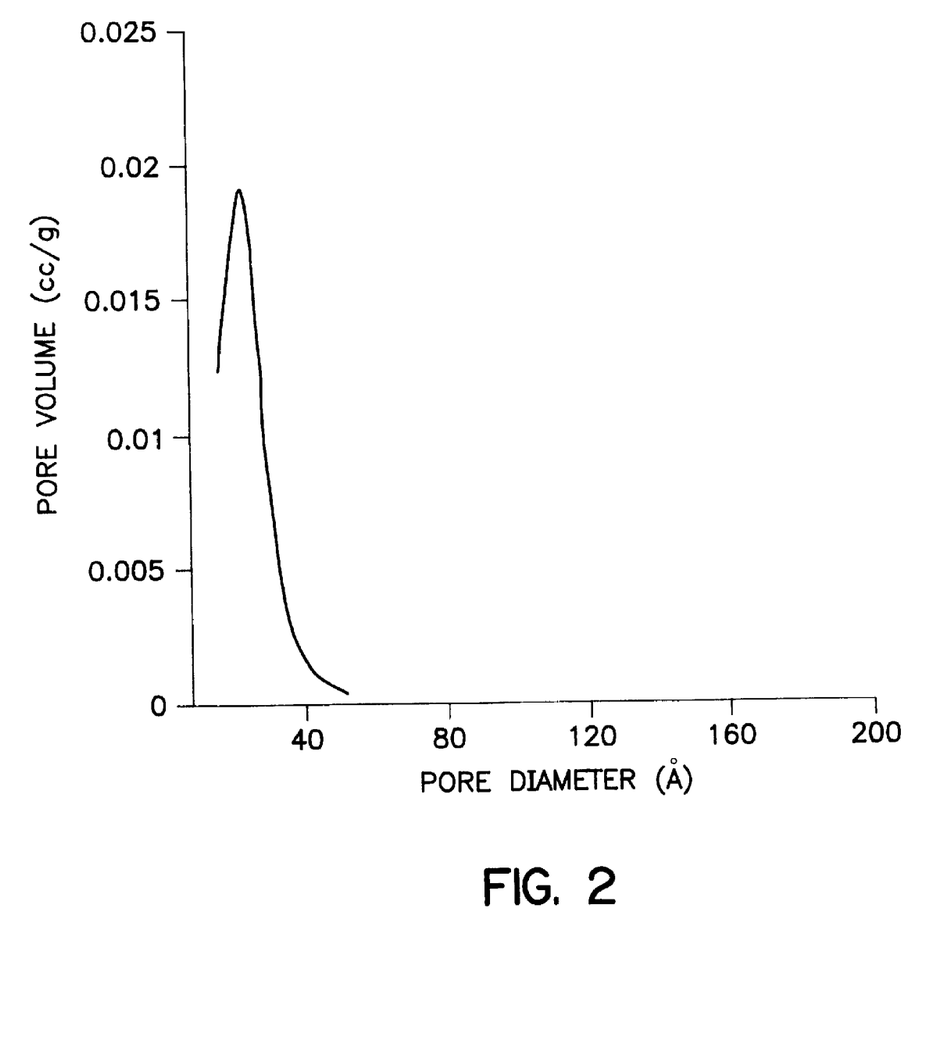
FIG. 2 is a derivative of the $N_2$ adsorption volume as a function of pore diameter for the product of Example 1, showing its size distribution of mesopores.
Figure 3:
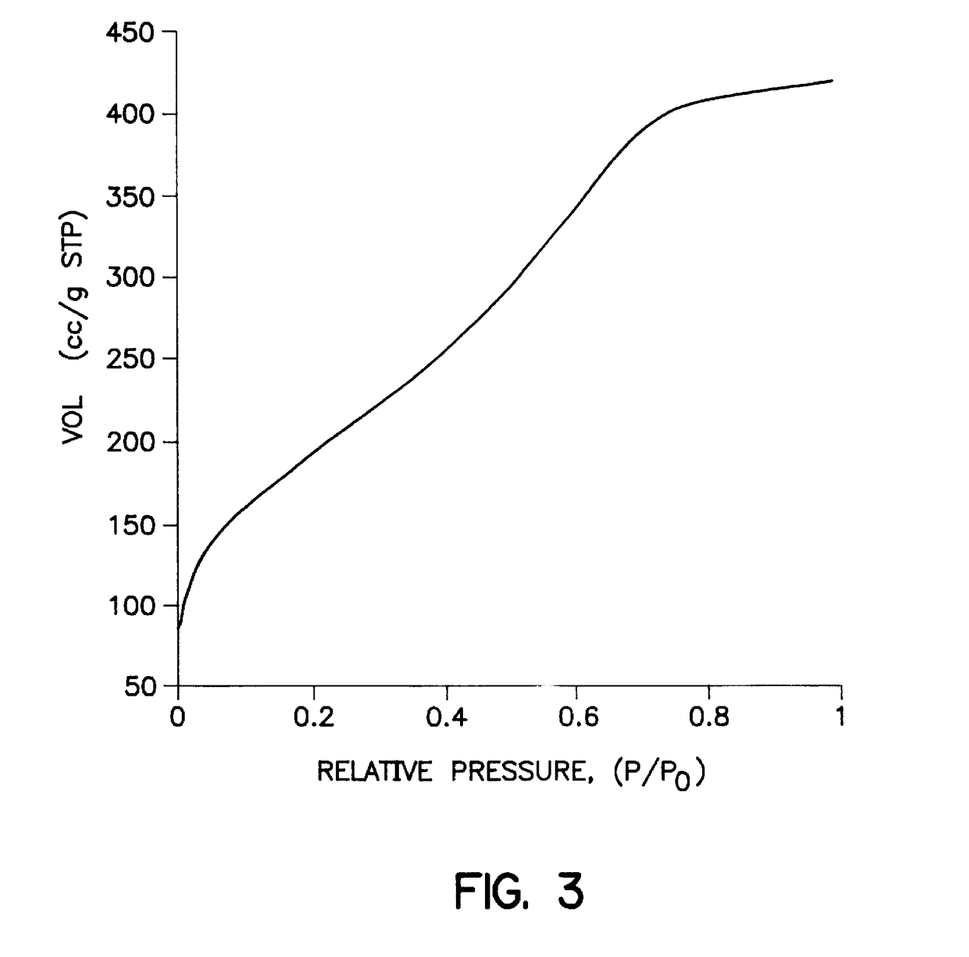
FIG. 3 is the $N_2$ adsorption isotherm for the product of Example 2.

The mesopore size distribution of the calcined material was determined from its equilibrium $N_2$ adsorption isotherm, according to ASTM Standard Practice D 4641. The $N_2$ adsorption isotherm for the calcined material is shown in FIG. 1. The isotherm has an inflection point at $P/P_0$ equal to 0.18, corresponding to the filling of pores 20 Å in average diameter. Beyond $P/P_0$ values of 0.80, the $N_2$ adsorption isotherm is essentially flat, indicating that the material does not contain pores larger than 100 Å in diameter. The well defined edge in the adsorption isotherm around its inflection point indicates that the material has a narrow size distribution of mesopores. This is better illustrated by plotting the derivative of the $N_2$ adsorption volume as a function of pore diameter, which for the calcined material is shown in FIG. 2. This figure indicates that the void volume associated to mesopores in the material can be allocated to a narrow size distribution with channels no larger than 25 Å in diameter.

The volume associated to pores 15 Å to 100 Å in diameter is equal to 0.36 cc/g, as determined from equilibrium $N_2$ adsorption capacity at relative $P/P_0$ pressures between 0.05 and 0.8.

The presence in the electron diffraction pattern (EDP) of a halo 0.0334 $Å^{-1}$ in radius, indicates that the product of this example contains short range order arrays with a d spacing (repeat distance) of 30 Å (see Example 4), and it is indeed an embodiment of the material of the present invention.

To demonstrate the enhanced hydrothermal stability of the material of the present invention, the product of this example was treated in a flow of 100% steam for 3 hours at 823 K. After treatment, the material maintained its original properties; that is, a void volume of 0.3 cc/g, as determined from the equilibrium $N_2$ adsorption capacity at relative $P/P_0$ pressures between 0.05 and 0.8, a narrow pore size distribution between 15 Å and 25 Å, centered around 20 Å, as shown by a well defined inflection point at $P/P_0$ equal to 0.18 in the $N_2$ adsorption isotherm, and a halo in the EDP with a 0.0334 $Å^{-1}$ radius, indicative of short range order with a d spacing of 30 Å.

EXAMPLE 2

This example demonstrates the criticality of the use of non-ionic surfactants according to the present invention.

An acid solution was formed by mixing 17.7 g of water and 9.1 g of HCI (37% wt). The solution was mixed with 2.1 g of tetraethylorthosilicate (TEOS) (98% wt) for 2 minutes at room temperature, giving rise to a clear solution with the following molar composition:

1 $SiO_2$:9.00 HCl:127.50 $H_2O$

This clear solution was placed in a sealed 60 mL Teflon-wall reactor, where it was kept at 20° C. for 72 hours, and then heated to 60° C. for 72 more hours. After this treatment a white solid was formed. This product was separated from the liquid by centrifuge, washed with water several times, and dried at room temperature under reduced pressure. Finally, the solid was calcined at 400° C. for 18 hours, in a flow of air.

Figure 4:
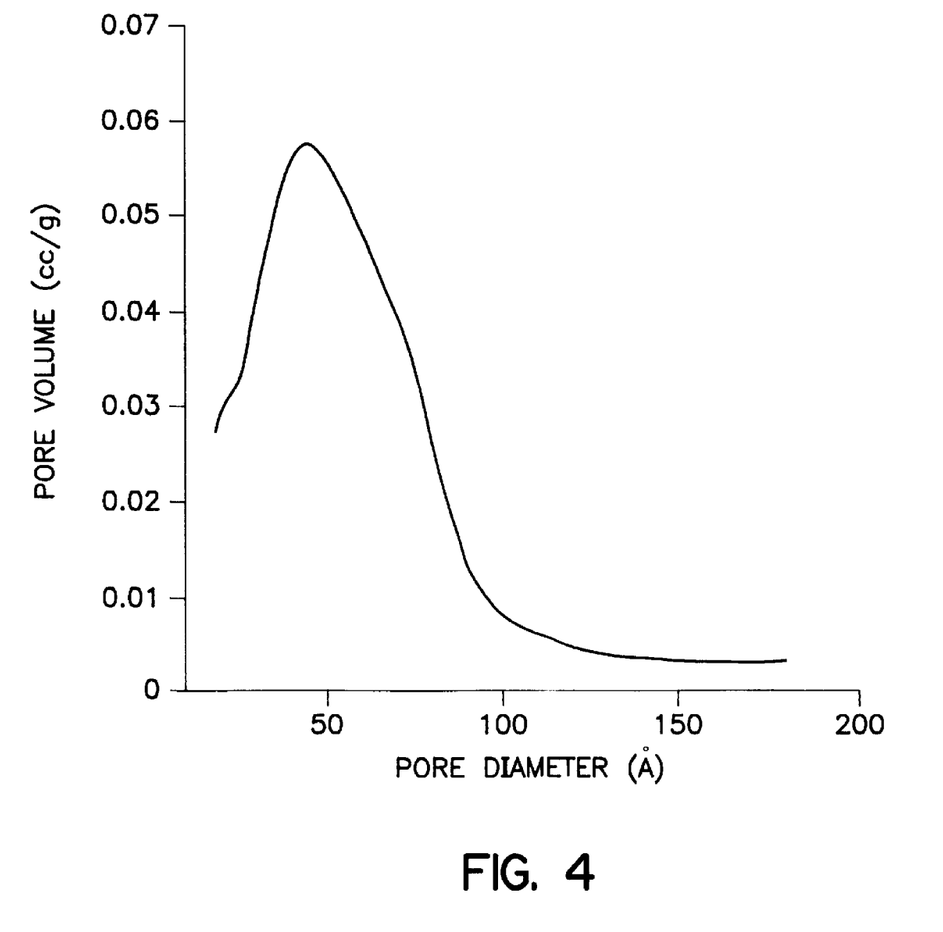
FIG. 4 is a derivative of the $N_2$ adsorption volume as a function of pore diameter for the product of Example 2, showing its size distribution of mesopores.

The mesopore size distribution of the calcined material was determined from its equilibrium $N_2$ adsorption isotherm, according to ASTM Standard Practice D 4641. The $N_2$ adsorption isotherm for the calcined material is shown in FIG. 1. The isotherm has an inflection point at $P/P_0$ equal to 0.55, corresponding to the filling of pores 55 Å in average diameter. Beyond $P/P_0$ values of 0.80, the $N_2$ adsorption isotherm is essentially flat, indicating that the material does not contain pores larger than 100 Å in diameter. The gradual raise in the adsorption isotherm around its inflection point indicates that the material has a broad size distribution of mesopores. This is better illustrated by plotting the derivative of the $N_2$ adsorption volume as a function of pore diameter, which for the calcined material is shown in FIG. 4. This figure indicates that the void volume associated to mesopores in the material can be allocated in a broad size distribution of pores between less than 20 Å and 100 Å in diameter.

The EDP for the product of this example only shows a well defined spot in the center of the pattern due to transmitted non-scattered electrons. The absence of a halo in the EDP indicates that the product of the present example is disordered.

EXAMPLE 3

This example demonstrates the criticality of the pH level during the gelification step according to the present invention.

Acid solutions of a non-ionic surfactant were prepared by mixing 17.7 g of water and 1.1 g para-nonyl phenol ethoxylated with fifteen moles of ethylene oxide per mole of alkylphenol plus the HCI required to achieve pH levels of 1, 2 and 4.5. Each solution was mixed with 2.1 g of tetraethylorthosilicate (TEOS) (98% wt) for 2 minutes at room temperature, giving rise to clear solutions with the following molar composition (excluding HCI):

1 $SiO_2$:0.10 C9Ph(EO)15:127.50 $H_2O$

Each clear solution was placed in a sealed 60 ml teflon-wall reactor, where they were kept at 20° C. for 72 hours, and then heated to 60° C. for 72 more hours. After this treatment a white solid was formed in all cases. These products were separated from the liquid by centrifuge, washed with water several times, and dried at room temperature under reduced pressure. Finally, the solids were calcined at 400° C. for 18 hours, in a flow of air.

At pH equal to 1, the material was prepared following the same procedure described in Example 1 which describes the properties of this material.

The textual properties of the calcined material prepared at pH equal to 2 were essentially the same as those of the one prepared at pH equal to 1. That is, the pH equal to 2 material exhibited an inflection point at $P/P_0$ equal to 0.18 in the $N_2$ adsorption isotherm; a narrow size distribution of mesopores, between 15 Å and 25 Å in diameter; a flat region beyond $P/P_0$ values of 0.80, indicating that no pores larger than 100 Å in diameter are present; a volume associated to mesoporous channels equal to 0.30 cc/g; and a halo in the EDP with a 0.034 Å$^{-1}$ radius, indicative of a short range order with a d spacing of 30 Å.

The material prepared at pH equal to 4.5, however, presents undesirable properties. Its $N_2$ adsorption isotherm shows a sharp raise at $P/P_0$ levels above 0.8, indicating the presence of a large fraction of pores larger than 100 Å in diameter; a broad mesopore size distribution, centered around 60 Å in diameter and 50 Å wide; and the absence of a halo in the EDP, demonstrating that the material is completely disordered.

EXAMPLE 4

This example includes a more detailed description of the characterization by Electron Diffraction (ED) of the material of the present invention, prepared according to Example 1, compared to a material prepared according to U.S. Pat. No. 5,098,684, which has long range order and the product of Example 2 which is completely disordered.

When a beam of high-energy electrons is directed toward a thin specimen, several phenomena can take place. One of them is the deflection of the incident electrons due to interactions with atoms in the specimen. When the material has long range order (i.e. it is crystalline) electrons are deflected toward a discrete number of precise directions, generating well defined spots in an EDP. The position of these spots is related to the spatial symmetry of structural features in the material, according to Bragg's law, and those skilled in the art of electron diffraction are able to provide information about the structure of a crystalline material from analysis of its EDP. On the other hand, electrons impinging on disordered materials are deflected in all directions, and thus, no features stand out in an EDP. Short range order materials offer an intermediate case between crystalline (long-range) and disordered materials. In this latest class of materials, there are structural features (believed to be the tortuous channels) that repeat themselves substantially throughout the material, but in correlations where the feature extends only a few times (up to about five times, while in the case of crystalline materials features can repeat themselves thousands, or at the very least hundreds of times). As a consequence, the EDP from a short range order material does not contain well defined spots, as in the case of a crystalline one, but rather diffuse halos, which radius is inversely proportional to the distance between the repeating features in the material. To illustrate these differences, EDP from three different materials are described: a long range order material (described in U.S. Pat. No. 5,098,684), a disordered material (the product of Example 2), and a short range order material (an embodiment of the material of the present invention, and the product of Example 1).

Samples from the products of Examples 1 and 2 to be analyzed by ED were prepared following essentially the same procedure described in Example 23 of U.S. Pat. No. 5,098,684. Each material was embedded in a low viscosity acrylic resin, which is then cured at 80° C. overnight. Sections of the block, about 500 Å thick, were cut by ultramicrotomy using a diamond knife. The samples were loaded onto a porous carbon electron microscopy grid, and were ready for analysis.

The electron diffraction pattern (EDP) was obtained with a 120 kV transmission electron microscope in nanoprobe mode with a point-to-point resolution of 3.2 Å. The incident beam used for the generation of the EDP shown in FIGS. 5 and 6 was about 50 Å wide.

Figure 5:
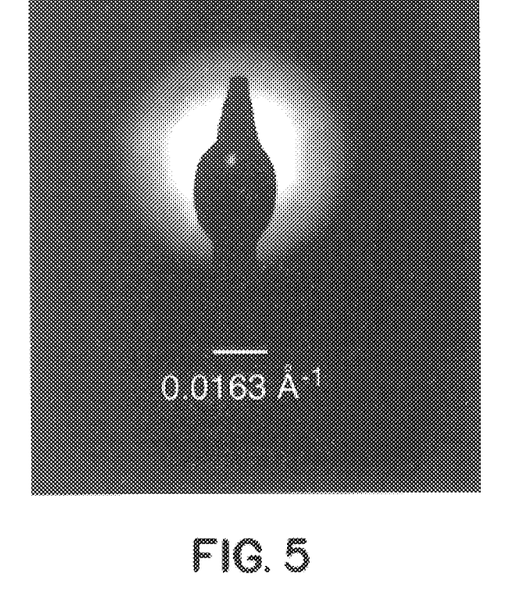
FIG. 5 is an electron diffraction pattern of the product of Example 1.
Figure 6:
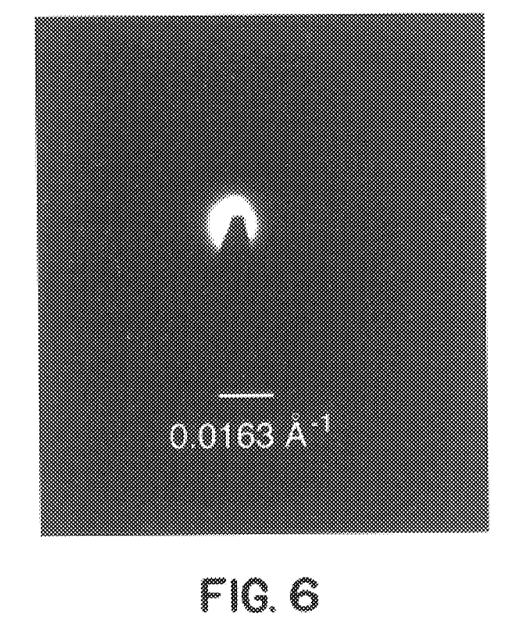
FIG. 6 is an electron diffraction pattern of the product of Example 2.

FIG. 5 is an EDP obtained for an embodiment of the material of the present invention, prepared according to the method described in Example 1. As previously discussed, the presence of a halo 0.0334 Å$^{-1}$ in radius is indicative of short range order in this material, with a d spacing between the repeating features of about 30 Å. This EDP is different from the one generated by a disordered material (FIG. 6), where only a bright spot in the center of the pattern is observed, due to transmitted non-deflected electrons; and from the arrays of spots observed in FIG. 18 of U.S. Pat. No. 5,098,684, corresponding to a long-range order material.

Another indication that the halo is representative of short range order is the fact that its presence in the EDP is independent of sample orientation. A characteristic of short range order materials is that the repeating features are isotropically distributed throughout its bulk. Therefore, it is not necessary to orient the sample in a particular direction to observe the halo, since they are all equivalent. This is indeed the case for the EDP from the product of Example 1. On the contrary, for long range order materials, where the structural features repeat hundreds or even thousands of times but in specific directions, the corresponding EDP is only observable when the electron beam impinges the sample in certain orientations. This is the case in U.S. Pat. No. 5,098,684, where the EDP of well defined spots indicative of a long range order with hexagonal symmetry is only observable when the electron beam impinges the sample in the appropriate orientation.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A composition of matter, comprising an inorganic porous metal oxide material, said material being a non-crystalline material having a short range order structure and having wall portions defining mesopore-sized channels having a mean diameter of between about 15 Å to about 100 Å and a narrow diameter distribution of less than or equal to about 30 Å, said material having a void volume from said mesopore-sized channels of at least about 0.1 cc/g.

2. A composition according to claim 1, wherein said material has a void volume from said mesopore-sized channels of at least about 0.2 cc/g.

3. A composition according to claim 1, wherein said composition exhibits an adsorption isotherm having inflection points between $P/P_0$ values of about 0.05 to about 0.8.

4. A composition according to claim 1, wherein said composition exhibits a substantially flat adsorption isotherm at $P/P_0$ values of greater than about 0.8.

5. A composition according to claim 1, wherein said channels are tortuous.

6. A composition according to claim 1, wherein said material exhibits a repeat value of less than or equal to about 5.

7. A composition according to claim 1, wherein said material exhibits only diffuse halos at d spacing values of larger than 20 Å.

8. A process for preparing an inorganic porous metal oxide material, comprising the steps of:

forming a solution of a hydrolyzable inorganic compound with a non-ionic surfactant having organic molecules;

inducing growth and condensation of a solid composition comprising an inorganic composition in intimate contact with said organic molecules by adjusting said solution to a pH equal to or within about ±2 pH numbers of an isoelectric point mean value of inorganic species of said inorganic compound; and extracting said organic molecules from said inorganic composition so as to provide said inorganic porous material having wall portions defining mesopore-sized channels having a mean diameter of between about 15 Å to about 100 Å and a narrow diameter distribution of less than or equal to about 30 Å, said material having a void volume from said mesopore-sized channels of at least about 0.1 cc/g.

9. A process according to claim 8, wherein said hydrolyzable inorganic compound is selected from the group consisting of chlorides, alkoxides, nitrates, hydroxides, sulphates and mixtures thereof.

10. A process according to claim 9, wherein said hydrolyzable inorganic compound is selected from the group consisting of nitrates, hydroxides and mixtures thereof.

11. A process according to claim 8, further comprising the step of adding an acid to said solution to adjust said pH.

12. A process according to claim 11, wherein said acid is HCl.

13. A process according to claim 8, wherein said non-ionic surfactant is selected from the group consisting of ethoxylated alcohols, ethoxylated alkylphenols, amine oxides, ethoxylated amines and mixtures thereof.

14. A process according to claim 13, wherein said non-ionic surfactant is present in a molar ratio of surfactant to inorganic species of said inorganic compound of between about 0.05 to about 20.

15. A process according to claim 8, wherein said extracting step comprises calcining said solid composition so as to extract said organic molecules and thereby form said channels.

16. A process according to claim 15, wherein said calcining step is carried out at a temperature of between about 400° C. to about 800° C., for a period of at least about 1 hour.

17. A process according to claim 8, further comprising the step of adding an organic water insoluble compound to said solution.

18. A process according to claim 17, wherein said organic water insoluble compound is selected from the group consisting of p-xylene, trimethylbenzene, triethylbenzene, dimethyladamantane and mixtures thereof.

19. A process according to claim 9, wherein said solution is prepared using a precursor of said hydrolyzable inorganic compound, wherein said precursor is selected from the group consisting of colloidal silica, alumina sols, suspensions of pseudo-bentonite, titania, zirconia, oxide hydrosols and mixtures thereof.

* * * * *